US006771726B2

(12) United States Patent  
Pomet (10) Patent No.: US 6,771,726 B2
(45) Date of Patent: Aug. 3, 2004

(54) DEVICE FOR THE REGENERATION OF A CLOCK SIGNAL FROM AT LEAST TWO SYNCHRONIZATION BITS

(75) Inventor: Alain Pomet, Rousset (FR)

(73) Assignee: STMicroelectronics SA, Montrouge (FR)

( * ) Notice: Subject to any disclaimer, the term of this patent is extended or adjusted under 35 U.S.C. 154(b) by 774 days.

(21) Appl. No.: 09/765,501

(22) Filed: Jan. 18, 2001

(65) Prior Publication Data

US 2001/0011914 A1 Aug. 9, 2001

(30) Foreign Application Priority Data

Jan. 18, 2000 (FR) .......................................... 00 00605

(51) Int. Cl.[7] .............................................. H04L 7/04
(52) U.S. Cl. ....................... 375/362; 375/373; 375/368; 327/165; 327/166
(58) Field of Search ................................ 375/362, 365, 375/368, 373, 374, 376; 327/165, 166; 713/500, 502, 503, 401

(56) References Cited

U.S. PATENT DOCUMENTS 4,606,050 A * 8/1986 Sekigawa et al. ........... 375/316
5,638,014 A 6/1997 Kurita ........................ 327/141
5,754,606 A * 5/1998 Matsuyama et al. ........ 375/373
6,343,364 B1 * 1/2002 Leydier et al. ............. 713/500
6,362,671 B2 * 3/2002 Malherbe et al. ........... 327/165

FOREIGN PATENT DOCUMENTS

EP  0 463 206 A   1/1992  .......... G01R/25/08
EP  0 917 290 A   5/1999  .......... H03K/5/26

* cited by examiner

*Primary Examiner*—Phoung Phu
(74) *Attorney, Agent, or Firm*—Lisa K. Jorgenson; Allen, Dyer, Doppelt, Milbrath & Gilchrist, P.A.

(57) ABSTRACT

A device for the regeneration of a clock signal uses a reference clock signal given by an internal oscillator to measure the number of reference clock pulses between the first two synchronization pulses sent by an external serial bus or USB at the beginning of each transaction. Thus a rough measurement N is obtained of the USB clock signal to be regenerated. The delay of each of these two synchronization pulses with respect to the previous pulse of the reference clock signal is measured. This delay is computed with respect to an internally defined time unit. On the basis of the measurement of these two delays, and the measurement of the number of reference clock periods, and knowing the measurement n of the period of the reference clock signal in the time unit, the period of the USB clock signal to be regenerated is computed with precision.

48 Claims, 5 Drawing Sheets

DEVICE FOR THE REGENERATION OF A CLOCK SIGNAL FROM AT LEAST TWO SYNCHRONIZATION BITS

FIELD OF THE INVENTION

The present invention relates to the field of data transmission, and, more particularly, to clock signal generation during data transmission.

BACKGROUND OF THE INVENTION

Data may be exchanged between devices over a serial bus according to a USB (user serial bus) type protocol. According to this protocol, the USB clock signal is not transmitted on the bus. Only some synchronization bits are sent at the beginning of transmission so that the devices connected to this bus can get synchronized, to send or receive data, on this bus. In systems using a data transmission protocol of this kind, the integrated circuits usually include a circuit for the generation of a synchronous clock signal based on a phase-locked loop and a quartz crystal.

The invention is concerned with a system comprising smart-card type portable carriers. Portable carriers of this kind cannot incorporate a circuit for the generation of a prior art synchronized clock signal because it is not possible to integrate either the quartz or the phase-locked loop therein, as these elements take up a great deal of space.

SUMMARY OF THE INVENTION

The invention therefore relates to a device for the regeneration of the clock signal of the bus, from a few external synchronization pulses, at least two of them. In the example of a USB serial bus, the regeneration of a USB clock signal must have high precision, in the range of 1%.

According to the invention, an internal oscillator is used, giving an internal frequency clock signal. This clock signal is used as a reference signal for the regeneration of the USB clock signal.

An object of the invention is to compute the number of reference clock signal pulses between the first two synchronization pulses sent on the USB bus at the start of each transaction. Thus, a rough measurement is obtained of the period of the USB clock signal. Furthermore, to ensure the synchronization and precision of the internally regenerated USB clock signal, the delay of each of these two synchronization pulses with reference to the immediately preceding pulse of the reference clock signal is measured. This delay is computed with reference to a time unit defined internally. From the measurement of these two delays and the measurement of the number of reference clock signal periods, it is possible to achieve a precise computation of the period of the USB clock signal and regenerate this USB clock signal synchronously.

The invention therefore relates to a device for the regeneration of a clock signal from at least two synchronization pulses transmitted on an external serial bus in an integrated circuit comprising an internal oscillator capable of giving a reference clock signal. The device preferably defines the time unit and provides a fine measurement, in the time unit, of the delay of two synchronization pulses each with respect to a preceding pulse of the reference clock signal. The device has a measurement of the reference clock signal period in the time unit available and further includes circuitry to measure the number of reference clock signal strokes between the two synchronization pulses. The measurements of delay, of the reference clock signal period and of the number of clock signal strokes being applied as starting data elements for a computation unit capable of computing the corresponding period and of initializing a countdown unit activated at each regeneration cycle to give a regenerated clock signal pulse at output.

BRIEF DESCRIPTION OF THE DRAWINGS

Other features and advantages of the invention are described in detail in the following description given by way of a non-restrictive indication and with reference to the appended drawings, of which.

DETAILED DESCRIPTION OF THE PREFERRED EMBODIMENTS

The present invention is more particularly described within the framework of an application to an integrated circuit carrying out transactions with other integrated circuits via a USB serial bus, but its use is not limited to this application. The bus in practice takes the form of two differential lines connected in each integrated circuit to a sender and a receiver.

Briefly, according to the protocol associated with such a bus, when a transaction is initiated, there is a first transitional phase during which the voltage of one of the differential lines rises while the voltage in the other line remains at zero. Then the transaction starts. According to the USB protocol, synchronization bits are first of all sent (by the system manager of the bus which has received a transaction request). Then, the circuit initiating the transaction sends its data.

Figure 1A:
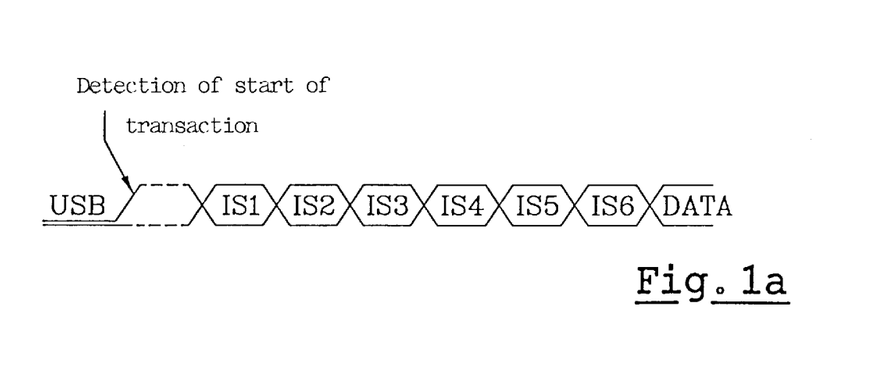
FIGS. 1a and 1b are timing diagrams illustrating the principle of regeneration of the clock signal of the bus according to the present invention.

FIG. 1a shows an exemplary beginning of a transaction on a USB type serial bus, with a transitional phase and the beginning of the transaction. The example shows six synchronization pulses IS1 to IS6 and then a sequence of logic data elements DATA, transmitted by the integrated circuit which has initiated the transaction.

As soon as the receiver of an integrated circuit concerned by the transaction detects a difference in voltage between the differential lines d+ and d– of the bus, the integrated circuits start a transaction initializing procedure. The integrated circuit gets ready to receive the synchronization bits, typically six bits for a USB bus, for the internal regeneration of the USB clock signal which will enable it to receive and/or send data elements.

According to the invention, the regeneration device uses a reference signal given by an internal oscillator of the integrated circuit. Thus, the initializing phase following the phase of detection of a start of a transaction includes initializing the internal oscillator and the stabilizing of the frequency of the clock signal given by the oscillator which will be used as a reference clock signal.

When this initialization phase is ended, the regeneration device according to the invention is ready. According to the invention, it can regenerate the clock signal of the bus from first synchronization bits received from the USB bus. The other pulses that are then received may be used to update the regeneration data.

Figure 1B:
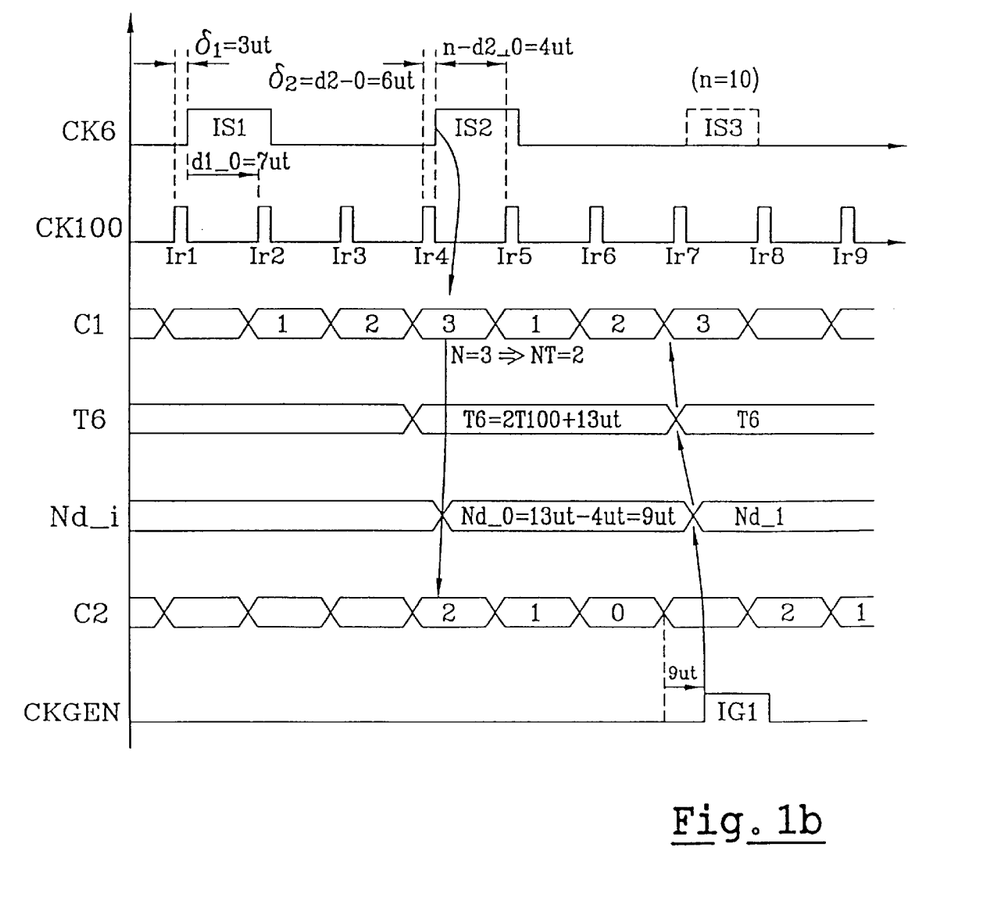

FIG. 1b shows the principle of regeneration according to the invention. After the reshaping of the signals received from the differential lines d+ and d− of the bus, a signal referenced CK6 is obtained. In this signal, synchronization pulses are therefore received, two in the example, and then a sequence of 0s and 1s corresponding to the data elements sent at the frequency of the USB clock signal is received. The frequency reference clock signal given by the internal oscillator is referenced CK100. These two signals CK6 and CK100 are not synchronous. In a practical example, the values will be typically CK6=6 MHz and CK100=100 MHz.

Between the first two synchronization pulses IS1 and IS2, it is possible to count a certain number N of pulses of the reference clock signal CK100. In the example, three pulses are counted. This corresponds to a number NT=N−1=2 integer periods of the reference clock signal. Thus, by using a simple counter activated (reset) by the first synchronization pulse IS1 and stopped by the next synchronization pulse IS2, it is possible to perform a measurement NT of the period T6 of the clock signal of the bus with respect to the reference clock signal CK100.

However, a measurement of this kind is not precise with respect to both the period and the synchronization. A measurement of this kind therefore is not sufficient to regenerate the clock signal of the bus in a precise way. Thus, the invention provides for the definition of a more precise time unit, and includes measuring in this time unit with, for example, a vernier.

The references IS1 and IS2 are given to the first two synchronization pulses received, and the references Ir1, Ir2, Ir3, . . . , Iri are given to the sequence of the pulses of the reference clock signal. A measurement is made, in the internally defined time unit, of the delay δ1 of the first synchronization pulse IS1 with respect to the previous pulse Ir1 of the reference clock signal CK100, and the delay δ2 of the second synchronization pulse IS2 with respect to the previous pulse Ir4 of the reference clock signal CK100.

With these different measurements, namely the measurement of the number N of pulses of CK100 and the measurement of the delays δ1 and δ2 in fine measurement units, it is possible to obtain a precise measurement of the external clock signal period. It is assumed that the clock signal period CK100 in the fine measurement time unit is known. T100= n.ut is written. One example, with CK100=100 Mhz, defines ut=1 ns and therefore n=10. This value n may for example be stored in a memory of the integrated circuit.

The period T6 sought is therefore given by $$T6 = NT.T100 + n - \delta1(ut) + \delta2(ut),$$

as can be seen in FIG. 1.b.

$$d1\_0 = n - \delta1 \text{ and } d2\_0 = \delta2$$

we note:

We then have:

$$T6 = NT.T100 + d1\_0(ut) + d2\_0(ut).$$

It is therefore possible to restore a clock signal of this frequency.

It is possible to improve the precision of the regeneration device according to the invention by providing, furthermore, for the internal measurement of the period of the reference clock signal CK100 in the time unit ut. Indeed, the signal given at output of an oscillator generally has a frequency that is variable from one integrated circuit to the other. For example, for an oscillator designed to give a frequency of 100 Mhz, in practice there will be a frequency whose value is contained for example in a window of 80 to 160 MHz.

According to the invention, it is therefore planned to have a learning cycle of the reference clock signal CK100 that includes the internal measurement of the number n expressing its period in units of fine measurement ut. But it is still necessary to restore this clock signal of the bus synchronously. To ensure this synchronization according to the principle of the invention and as shown in FIG. 1b, the operation starts with the second synchronization pulse IS2 to start the counting (or countdown) of the period T6 computed, to generate the first pulse IG1 of the clock signal of the bus. In other words, the second pulse IS2 is used as a synchronization beep, actuating the first regeneration cycle. Starting from this synchronization beep, the computed period T6 will be counted down or counted down.

Let it be assumed that there is a countdown of the NT reference clock signal strokes. This countdown starts from the first pulse Ir5 of the reference clock signal CK100 following the second synchronization pulse IS2 (FIG. 1b). In fact, when these NT clock signal strokes are counted down, the period existing between the second synchronization pulse IS2 and the following pulse Ir5 of the reference clock signal CK100 has elapsed and is therefore implicitly counted down. This elapsed period can easily be computed in the internally defined time unit: it is equal to n−d2_0, as shown in FIG. 1b.

When the NT clock signal strokes are counted down, there therefore actually remains a period to be counted down equal to [d1_0+d2_0−(n−d2_0)].ut. It is possible to count down or check the lapse of a period of this kind, to activate the sending of a pulse IG1 on the regeneration signal CKGEN of the clock signal of the bus. This pulse is thus generated with high precision both in frequency and in phase (synchronization).

Each regeneration cycle following the first regeneration cycle is activated by the pulse CKGEN regenerated by the previous cycle. Thus, the pulse IG1 is used as a synchronization beep to regenerate the pulse IG2 (not shown). Each regenerated pulse of CKGEN is therefore used as a synchronization beep for the next regeneration cycle.

It is also possible to use a synchronization beep that is a pulse received on the signal CK6, concurrently with the pulse regenerated on CKGEN. If for example the pulse IS3 shown in dashes in FIG. 1b is received, this pulse IS3 can be used as a synchronization beep or else as the regenerated pulse IG1.

At each new regeneration cycle, the data used for the countdown of the period T6 has to be updated, on the basis of the synchronization beep used (IG1 or IS3). For example, for the second regeneration cycle, if the synchronization beep used is the regenerated pulse IG1, the new time period d1_1, corresponds to the time period n−d2_0. In general, if d1_i−1 and d2_i−1 are the time periods used for the generation of the ith pulse IG1 of the clock signal CKGEN, we have the following for the generation of i+1st pulse IGi+1:

$$d1\_i = n - d2\_i - 1.$$

The period $d2\_i$ is deduced from $d1\_i$ in noting that the period of CK6, therefore CKGEN, is constant:

$T6(i)=T6(i-1)$, giving:

$NT.T100+d1\_i-1+d2\_i-1=NT.T100+d1\_i+d2\_i$.

We therefore have:

$d2\_i=d1\_1+d2\_i-1-d1\_i$

In another embodiment of the invention, a new measurement n is made of the period of the reference clock signal CK100 at each regeneration cycle so as to follow the possible variations in frequency of the signal, especially with the temperature. Thus, the precision of the device is improved.

Thus, for each new regeneration cycle, where the values for initializing the countdown are recomputed from the data elements of the previous regeneration cycle, the value n is updated. It is enough, for example, to plan that, in the sequencing, the pulse CK100 following the pulse taken as a synchronization beep will activate this measurement of the period of CK100. Other improvements may be made to the invention, further enhancing the precision of the regeneration device.

Earlier, it was indicated that, at each regeneration cycle following the first regeneration cycle, it was enough to compute the new values to be used for the countdown of the period T6 from the synchronization beep. In one variation, it is planned to update the values $\delta 1$, $\delta 2$, n, N used to constantly recalibrate the device. Preferably, the countdown values are recomputed from the new measurements acquired during the regeneration cycle considered.

With regard to the value n, it has already been seen that it was possible to launch a measurement at each new regeneration cycle. To re-measure the values $\delta 1$, $\delta 2$ and N, it is necessary to take account of the pulses of CK6 that follow the first two synchronization pulses IS1 and IS2 to launch the corresponding acquisition cycles. It is necessary here to distinguish the measurement of $\delta 1$ from the measurements of $\delta 2$ and N. Indeed, the latter two measurements cannot be made except when a second pulse of CK6 is received one clock signal period of CK6 after a first pulse of CK6.

After the first regeneration cycle, it is necessary to distinguish therefore between the pulses of CK6 received to process them either as the first synchronization pulse IS1 and launch a first corresponding acquisition cycle or as the second synchronization pulse IS2 and launch the second corresponding acquisition cycle.

In the implementation of the invention, it is then possible to choose two options. A first option takes account of a new measurement of $\delta 1$ in the following regeneration cycle only if, in this following cycle, it is possible to measure $\delta 2$ and N, which implies that there is a pulse received that is actually a second pulse as understood in the invention.

In a second option, any new measurement of $\delta 1$ is routinely taken into account. In any case, starting from the first regeneration cycle, it is necessary for example to update an indicator at each reception of a new pulse of CK6, so as to know whether this pulse has to be processed as a first synchronization pulse to launch a first acquisition cycle or as a second synchronization pulse to launch a second acquisition cycle.

In a first acquisition cycle, a new measurement of $\delta 1$ is obtained and the measurement of N is launched. If this new measurement of $\delta 1$ is used to update the data for regenerating the cycle in progress, we have $d1\_1=-\delta 1$. The period $d2\_i$ is deduced from $d1\_i$ by the following equality:

$T6(i)=T6(i-1)$, which gives:

$NT.T100+d1\_i-1+d2\_i-1=NT.T100+d1\_i+d2\_i$.

We therefore have:

$d2\_i=d1\_i-1+d2\_i-1-d1\_i$.

In a second acquisition cycle, $\delta 2$ and N are measured. $\delta 1$ has been measured at the previous regeneration cycle. The following new values are deduced therefrom for the regeneration cycle i in progress: $d1\_i=n-\delta 1$; $d2\_i=\delta 2$; $NT=N-1$; $T6=NT.T100+d1\_i+d2\_i$. Thus, the regeneration device is recalibrated throughout a transaction with the serial bus, giving the benefit of optimal precision.

Figure 2:
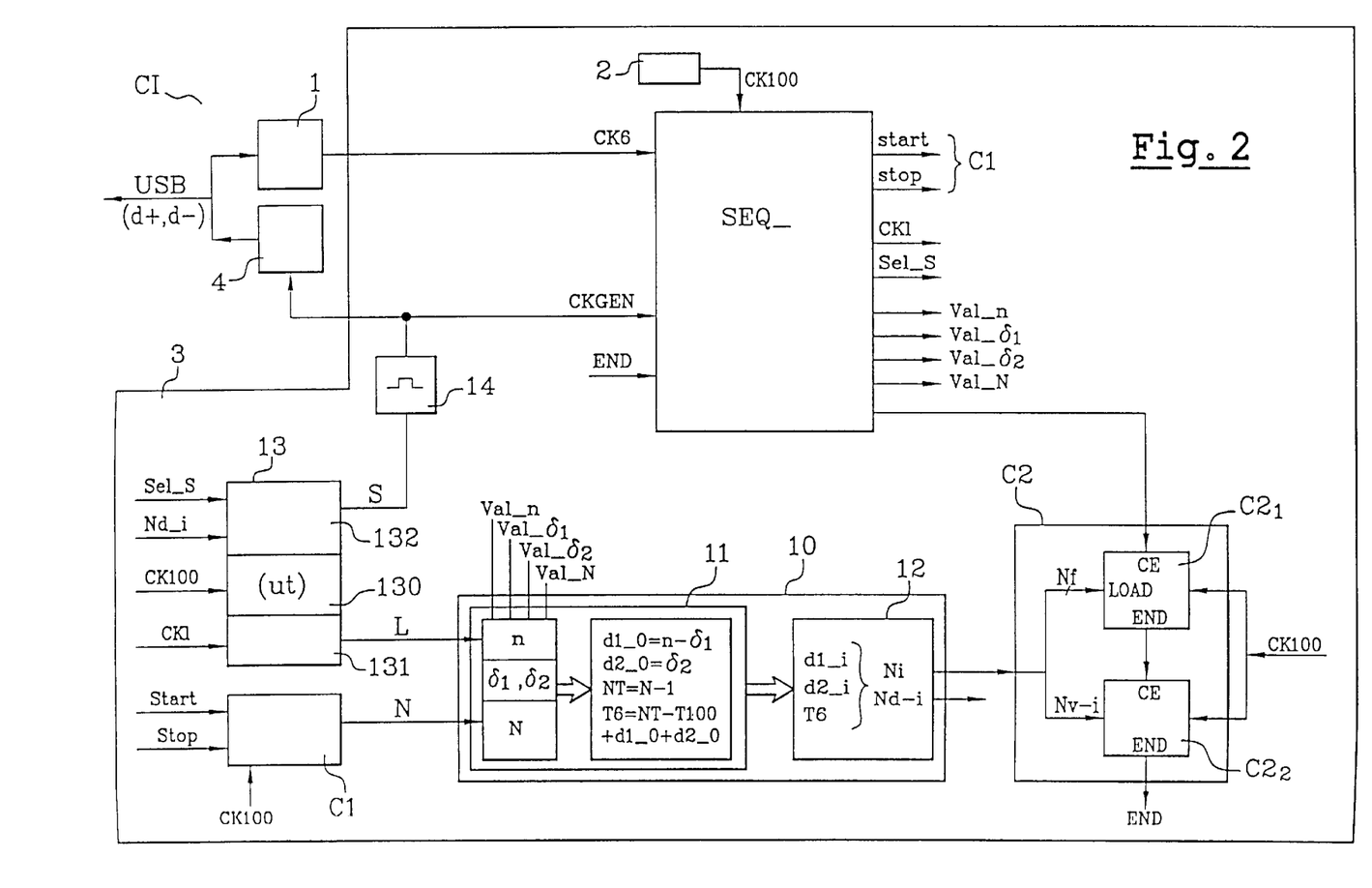
FIG. 2 is a schematic block diagram of a device for the regeneration of a clock signal synchronized according to an embodiment of the invention.

FIG. 2 shows the general architecture of the regeneration device according to the invention in an integrated circuit carrying out transactions on a USB type serial bus. The integrated circuit CI shown in this figure chiefly has an input stage 1 of the USB serial bus, an oscillator 2, a device 3 for regenerating the clock signal of the bus and an output stage 4 on the serial bus or USB to which the regenerated clock signal CKGEN is applied.

The input stage 1 gives a reshaped signal referenced CK6 at output. On this signal, at each transaction, there are retrieved firstly synchronization bits, then a sequence of 0's and 1's corresponding to data elements transmitted. The internal oscillator 2 has a matched structure to give a clock signal having a stable frequency CK100 used as a reference clock signal. The regeneration device 3 according to the invention includes a sequencer SEQ, measurement device C1, 13, computation unit 10 and a regeneration device C2, 13, 14.

Figure 5:
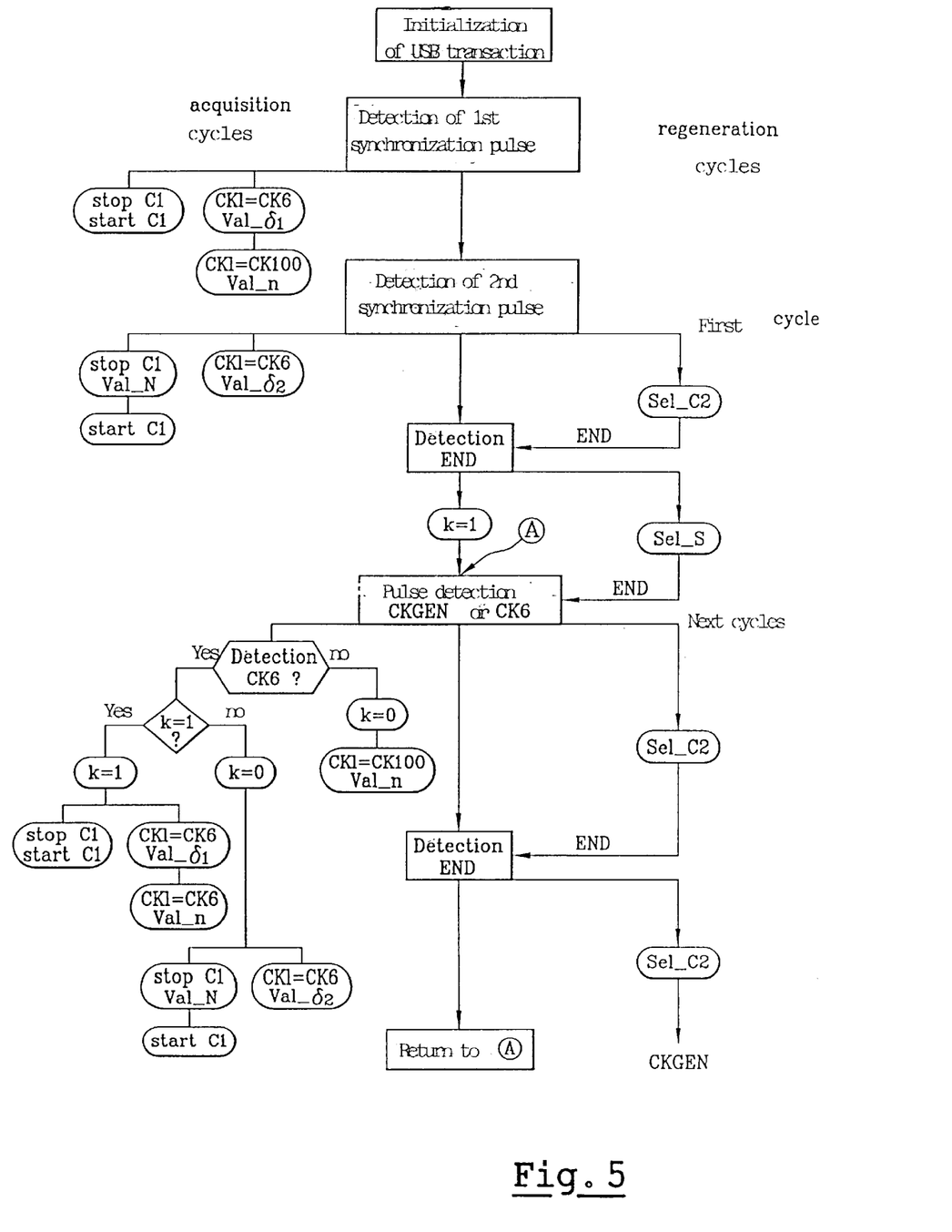
FIG. 5 is a flow chart of an exemplary sequencing of a device according to the invention.

The sequencer SEQ is a logic circuit that gives all the sequencing signals needed for the efficient working of the device. An exemplary sequencing is shown in FIG. 5. The computation unit (not shown) is formed of counters, adders, state machines which provide the performance of all the computations needed for regeneration, as seen with reference to FIG. 1b.

This computation unit 10 has two distinct functions: a first function 11 linked to the acquisition cycles of the measurements of n, N, $\delta 1$ and $\delta 2$ and a second function 12 linked to the preparation of initializing data Ni and Nd\_i enabling the sending of a pulse at each regeneration cycle. For the first function 11, the computation unit receive information elements from a vernier type measurement circuit 13 and a counter C1. The reading of the results of the measurement of the different calibration parameters $\delta 1$, $\delta 2$, n and N is activated by the sequencer by control signals Val\_$\delta 1$, Val\_$\delta 2$, Val\_n, Val\_N applied to the computation unit.

The measurement circuit 13 which will be described in detail further below comprises means 130 to define a time unit ut, means 131 for measurement in this unit and means 132 for the generation of a period expressed in this unit. The measurement means 131 receive a control signal CK1 at input. This control signal is controlled by the sequencer to give the computation unit 10, the measurements $\delta 1$ and $\delta 2$, in imposing CK1=CK6, and the measurement of n in imposing CK1=CK100.

The counter C1 is controlled by the sequencer to give the number N of reference clock signal strokes CK100 between two synchronization pulses CK6. As a counting clock signal, it receives the internal reference clock signal CK100. According to the principle of regeneration of the invention, it must be activated by the first synchronization pulse of CK6 and stopped by the second synchronization pulse of CK6. In practice, it is planned to stop it and then reactivate it by resetting it at each pulse, the sequencer being capable of activating the reading of this counter C1 by computation unit 10 in applying an enabling signal Val_C1 to them when the current pulse of CK6 is a second pulse as understood in the invention.

More generally, in an exemplary sequencing (FIG. 5) in which it is sought to recalibrate, during transaction, the regeneration data, the sequencer discriminates between three possible situations. When it detects a new pulse CKGEN, if it receives a pulse CK6, it uses this pulse as a synchronization beep and then determines which measurements it should launch. In the example shown in FIG. 5, it uses an indicator k which tells it whether the pulse CK6 has to be processed as a first pulse or a second pulse. In both cases, namely at each first cycle and at each second cycle, it stops and then reactivates the counter: this is written in FIG. 5 as follows: stop C1; start C1.

At each new pulse of CK6 that is to be processed like the first synchronization pulse IS1, the sequencer activates the first acquisition cycle. In this first acquisition cycle, it launches a measurement of N (stop; start) and applies CK1=CK6 and activates the command Val_$\delta$1 to launch the reading of $\delta$1. It applies CK1=CK100 and activates a command Val_n to launch the reading of n.

At each new pulse of C6 to be processed as the second synchronization pulse IS2, the sequencer activates the second acquisition cycle. In a second acquisition cycle, after having activated the command "stop" by which the counter is stopped and its contents applied at output, it activates the command VAL_N to launch the reading of N, and then launches a new measurement of N (start). It applies CK1=CK6 and activates a command Val_$\delta$2 to launch the reading of $\delta$2. It applies CK1=CK100. At each pulse of CKGEN for which the sequencer does not detect a pulse CK6 at the same time, the sequencer activates a third acquisition cycle. In this third acquisition cycle, it applies CK1=CK100 and activates a control Val_n to launch the reading of n. It will be noted that, with the sequencing described, if the synchronization pulse IS3 is received, this pulse is processed as the second pulse IS2 as regards the measurements. Other sequencing operations are of course possible.

Starting from these data elements N, $\delta$1, $\delta$2 and n, the first function 11 of the computation unit 10 prepares the starting data elements used as a basis for the regeneration, namely d1_0, d2_0, NT and T6. For the second computation function 12 of the computation unit 10, these starting data elements are received, and from these starting data elements, the position of the next pulse of the regenerated clock signal and then the position of the following pulse and so on will be predicted. Whenever the first function prepares new starting data elements, it gives these new data elements to the second function.

For the regeneration cycle in progress, this second function 12 prepares the initialization data of the countdown means of the period T6 computed. These initialization data elements are the number Ni of clock signal strokes CK100 and the number Nd_i of time units ut to be counted down before sending a pulse on the regenerated clock signal CKGEN. The number Ni is applied in the example to a triggered counter C2, used as a countdown unit. This counter receives a clock signal which is the internal reference clock signal CK100. It is activated at each synchronization beep by an activation signal Sel_C2 sent by the sequencer, giving rise to the loading of the value Ni present at input. The passage to zero of the counter leads to the activation of an internal signal END.

In practice, the counter C2 is formed by two counters, a first counter $C2_1$ to count down a value Nf which is always fixed, and a second counter $C2_2$ to count down a variable value Nvi. We have Ni=Nf+Nvi. Thus, during the countdown of the fixed part, there are known ways of carrying out the different acquisition cycles and taking account of the new measurements to recompute Ni and Nd_i in the regeneration cycle in progress, and initialize the second counter $C2_2$ with the variable part Nvi. In this case, the signal Sel_C2 is applied to the first counter, the signal $END_1$ of the first counter activating the second counter, which gives the signal END of the counter C2.

This signal END is applied to the input of the sequencer so that it can activate the means 132 for generating a period of the measurement circuit 13. These means 132 then take account of the new value Nd_i applied at input to activate an output S on the expiration of the corresponding period of time Nd_i.ut following the pulse of CK100. This output S is applied to an input of a circuit 14 for generating an output pulse on the regenerated clock signal CKGEN. This circuit 14 is calibrated appropriately, as a function of the application. In this variant, Nd_i $mod_n$ is applied as an input, instead of Nd_I, to the means of generating a time period 132. For this purpose, it is planned, in the second computation function, to increment Ni as many times as Nd_i contains n.

Figure 3:
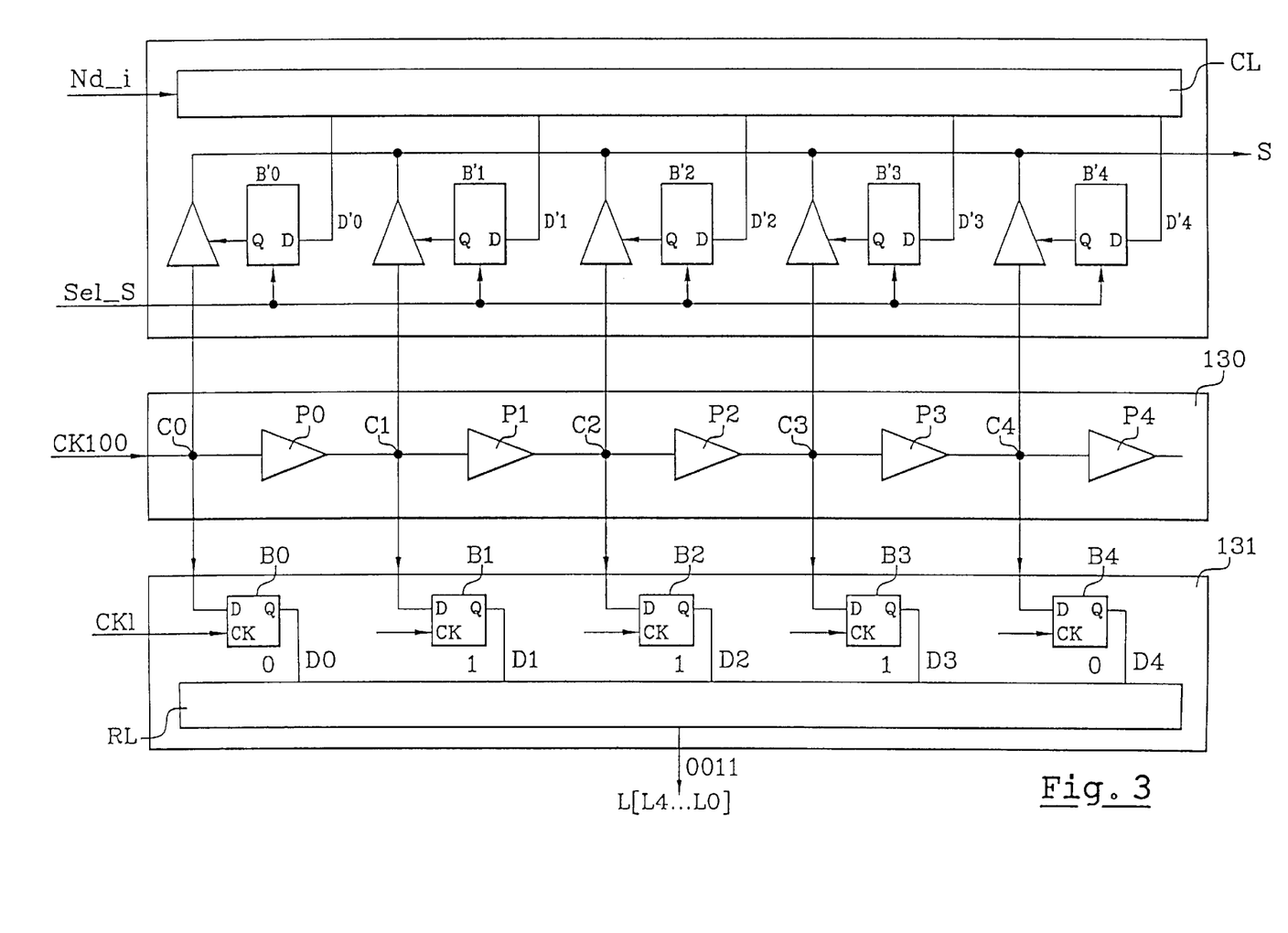
FIG. 3 is a schematic diagram illustrating a detailed example of a circuit for definition and measurement in time units used in the device according to the invention.

The measurement circuit 13 will now be described in detail with reference to FIG. 3. It has been seen that this measurement circuit 13 comprises a circuit 130 for defining a time unit; a time unit measurement circuit 131 that gives the result of the measurement at an output L, applied to the computation unit 10; and a circuit 132 for generating a signal S on the expiration of the time period Nd_i expressed in time units. This output S is applied as an input of a pulse generation circuit 14 that delivers the regenerated clock signal CKGEN at output.

The circuit 130 for defining a time unit comprises a sequence of identical, series-connected delay circuits or gates P0, P1, . . . . The internal reference clock signal CK100 is applied as an input of this sequence, possibly through a phase-matching stage (not shown). In each gate, this signal CK100 is delayed by one time unit ut. In practice, a gate includes two inverters. Preferably, the structure of these inverters is such that the same delay ut is precisely obtained, at each gate.

To this definition circuit are connected the measurement circuit 131 and the time period generation circuit 132. The measurement circuit 131 includes chiefly of the flip-flop circuits B0, . . . , B4 and a read register RL. To each gate there thus corresponds a flip-flop circuit in the measurement circuit. The input of a gate is applied as an input to the flip-flop circuit while the output of the flip-flop circuit is applied to an input of the read register RL. Thus, in the example, the input C0 of the gate P0 is applied to the input of a flip-flop circuit B0, the output of which is applied to the data input D0 of the read register RL.

These flip-flop circuits of the measurement circuit are, in this example, D type flip-flop circuits. As a clock signal, they receive the signal CK1, given by the sequencer and equal to CK100, for the measurement of n and CK6 for the measurement of $\delta$1 and $\delta$2. The read register RL receives the outputs of the flip-flop circuits as data inputs. It gives the corresponding data element L at output to the computation means 11.

Figure 4:
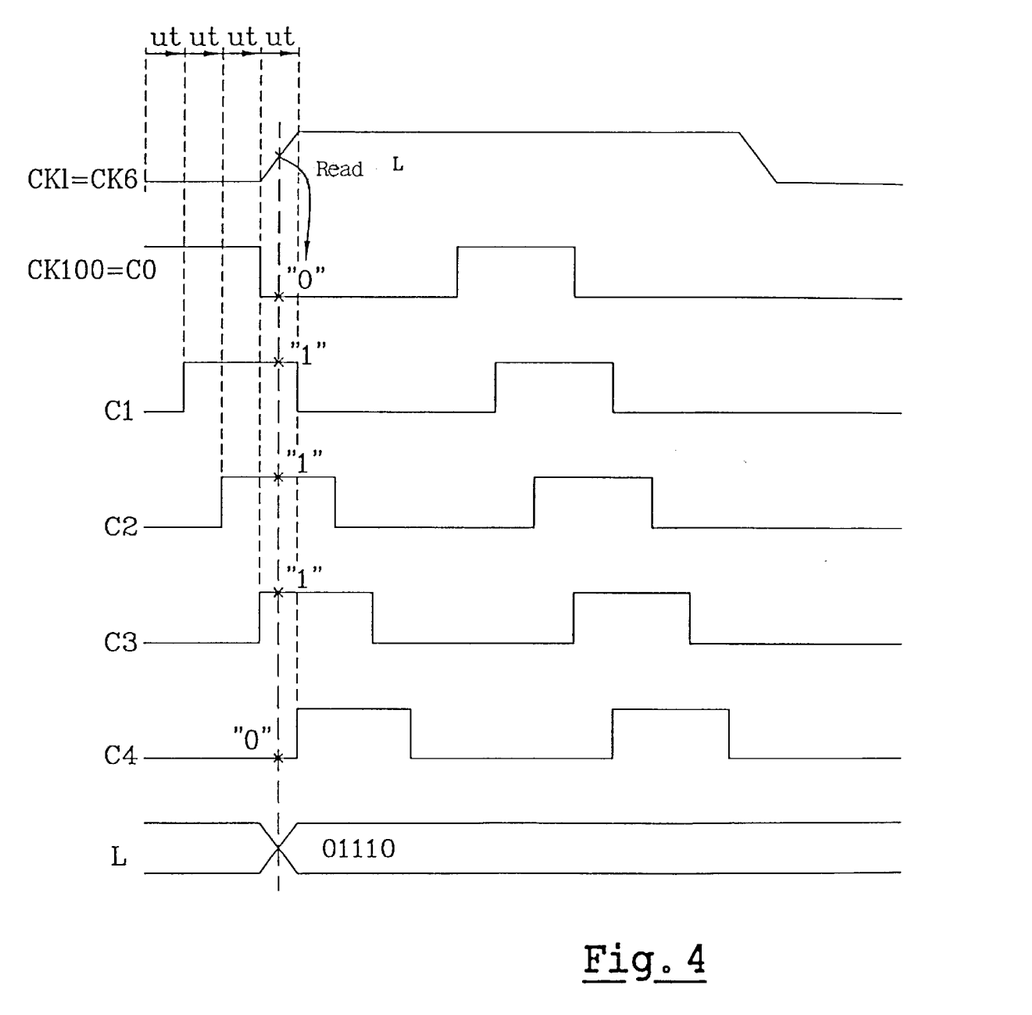
FIG. 4 is a timing diagram illustrating an exemplary measurement of a time period with the circuit shown in FIG. 3.

The measurement principle is expressed with reference to FIG. 4, which shows the signal CK100 at different inputs C0, C1. This signal is offset in time. It is assumed here that this is a learning cycle. We therefore have CK1=CK6. Thus, when the pulse CK6 arrives, the flip-flop circuits store an information element DATA which, in the example, is equal to 01110, and is used to identify the place at which this pulse of CK100 is located at this time, or more exactly its active edge (leading edge in the example). From this information, it is possible to deduce the number of time units ut between this edge of CK100 and the edge of CK6. In the example, this means that the pulse CK6 has reached between the fourth gate B3 and the fifth gate B4. It is thus possible to deduce therefrom that CK6 is offset by four time units ut with respect to CK100. From the data element DATA, it is thus possible to deduce the number of time units via a logic that is not detailed, but which is considered to be included in the function of the read register RL in the figure. In the example, L=00100 (i.e. 4) is obtained at the circuit output 131.

If CK1=CK100, the number of time units between two consecutive pulses is obtained. It is thus that the time periods δ1, δ2 and n can be measured. The circuit 132 for generating a time period Nd.ut comprises a set of controlled gates PS0, PS1, . . . , and a control circuit for these controlled gates. This circuit in practice selects the input of a gate of the definition circuit 130 and applies it to the output S, as a function of the input data element Nd_i. In other words, this circuit fulfills a multiplexing function. It will be understood that, if the input C2 of the gate B2 is selected to connect it to the output S, the signal CK100 delayed by two time units is obtained at this output S. Thus, according to the principle of the invention, returning to FIG. 2, a pulse is sent on the signal S, two time units after the last clock signal stroke CK100 counted down in the counter C2. This pulse activates the pulse generator 14, which gives a calibrated pulse on the signal CKGEN.

Each control gate of the circuit 132 is connected in practice between the input of a gate of the circuit 130 and the output S of the circuit 13. The control circuit of these gates includes, in the example, a logic circuit CL of the decoder type and a set of flip-flop circuits B'0, B'1, . . . . These flip-flop circuits of the circuit 132 each have their data input controlled by a corresponding output of the logic circuit CL which makes a selection, among these data inputs, of the input to be set at 1 and places all the other inputs at 0 as a function of the number Nd_i of time units that is applied to it. In one example, if Nd_i=00011 is applied to it at input, this circuit places the inputs of the flip-flop circuits B'0, B'1, B'2, B'4 at 0 and the input of the flip-flop circuit B'3 at 1. The output of each flip-flop circuit controls the associated controlled gate. Thus, at output S, there is delivered a pulse delayed by Nd_i.ut, namely three ut in the example, with respect to the last pulse of CK100. The activation of this circuit CL is controlled by the enabling signal Sel_S, activated by the sequencer as soon as the counter C2 goes to zero (signal END).

The definition and measurement circuit 13 is sized in practice as a function of the application. In a typical example, it has eight stages of gates.

The invention that has just been described is used for the internal regeneration of the clock signal of the USB bus from only the first two synchronization pulses; In this case of the USB bus which sends six synchronization pulses, the USB clock signal is regenerated as soon as the second pulse arises, the other synchronization pulses being used only for the updating. Practical embodiments of the device with a matched sequencing logic depend on the options chosen with respect to the updating of the measurements.

With a device according to the invention, it is possible in practice to regenerate the clock signal of the bus with high precision. The device is more particularly applicable in integrated circuits of smart-card type portable carriers, but may be used in a more general way.

That which is claimed is:

1. A device for the regeneration of a clock signal from at least two synchronization pulses transmitted on an external serial bus in an integrated circuit including an internal oscillator for providing a reference clock signal, the device comprising:
   a time unit defining circuit for defining a time unit;
   a delay measurement circuit for providing a fine measurement, in the time unit, of a delay of the at least two synchronization pulses each with respect to a preceding pulse of the reference clock signal;
   reference clock signal stroke measurement circuit for measuring a number of reference clock signal strokes between the two synchronization pulses;
   a countdown circuit for outputting a regenerated clock signal pulse at each regeneration cycle; and
   a computation unit receiving the measured delay, a measurement of a time period of the reference clock signal and the measured number of clock signal strokes for computing the corresponding period and initializing the countdown circuit to output the regenerated clock signal pulse.

2. A device according to claim 1, wherein the time unit defining circuit comprises a sequence of delay circuits for receiving the reference clock signal, and wherein a delay applied by each delay circuit is equal to the time unit.

3. A device according to claim 2, wherein the delay measurement circuit comprises:
   a read register; and
   a respective flip-flop circuit for each delay circuit;
   an input of each delay circuit being connected to an input of the associated flip-flop circuit, and an output of the flip-flop circuit being applied to a corresponding input of the read register.

4. A device according to claim 3, wherein the pulses received from the serial bus are applied as a sequencing clock of the flip-flop circuits to obtain the measurements of the delays at output of the read register.

5. A device according to claim 3, wherein the time unit defining circuit and the delay measurement circuit provide the measurement of the time period of the reference clock signal in the time unit, and wherein the reference clock signal is applied as a sequencing clock signal for the flip-flop circuits of the delay measurement circuit.

6. A device according to claim 1, wherein each regeneration cycle is activated by a synchronization signal from which the countdown circuit is activated, the synchronization signal of a first regeneration cycle being provided by a second one of the at least two synchronization pulses, and the synchronization signal of each following regeneration cycle being provided by one of the regenerated clock signal pulse at the preceding cycle and another pulse received on the serial bus concurrently with the regenerated clock signal pulse.

7. A device according to claim 1, wherein the countdown circuit is initialized at each regeneration cycle by a first initialization data element corresponding to the number of reference clock strokes to be counted down and a second initialization data element corresponding to a time unit to be counted down.

8. A device according to claim 7, wherein the initialization data elements of the first regeneration cycle are generated by the computation unit from the measured delay, the measurement of the time period of the reference clock signal and the measured number of clock signal strokes, as starting data elements.

9. A device according to claim 8, wherein the initialization data elements of each following regeneration cycle are generated by the computation unit from at least one starting data element for the initialization of the previous regeneration cycle.

10. A device according to claim 9, wherein the starting data elements are updated during a transaction initiated with the serial bus.

11. A device according to claim 7, wherein the counter circuit comprises a triggered counter, and wherein the first initialization data element is applied to the triggered counter which also receives the reference clock signal as a sequencing clock signal.

12. A device according to claim 11, wherein the triggered counter comprises:
   a first counter for counting down a fixed value; and
   a second counter, connected in series to the first counter, for counting down a variable value that is variable as a function of the corresponding initialization data element, so that the computation unit generates the initialization data elements for the current regeneration cycle during the countdown of the fixed value by the first counter.

13. A device according to claim 7 wherein the time unit defining circuit comprises a sequence of delay circuits for receiving the reference clock signal, wherein a delay applied by each delay circuit is equal to the time unit, wherein the countdown circuit comprises a transmission circuit for outputting a reference clock pulse delayed by a number of time units corresponding to the second initialization data element, and wherein the transmission circuit comprises an application circuit for applying the input of one of the delay circuits to the outputted reference clock pulse.

14. A device according to claim 13, wherein the application circuit comprises:
   a plurality of gates each being controlled by one of the delay circuits; and
   a control circuit to control the gates so that only one is on as a function of the second initialization data element.

15. A device according to claims 14, further comprising a calibrated pulse generator controlled by an output of the transmission circuit, for outputting the regenerated clock signal.

16. A device according to claim 1, wherein the external serial bus is an USB type bus.

17. An integrated circuit comprising:
   an oscillator for providing a reference clock signal;
   a serial bus; and
   a device for the regeneration of a clock signal from at least two synchronization pulses transmitted on the external serial bus, the device comprising
      a time unit defining circuit for defining a time unit,
      a delay measurement circuit for providing a fine measurement, in the time unit, of a delay of the at least two synchronization pulses each with respect to a preceding pulse of the reference clock signal,
      reference clock signal stroke measurement circuit for measuring a number of reference clock signal strokes between the two synchronization pulses,
      a countdown circuit for outputting a regenerated clock signal pulse at each regeneration cycle, and
      a computation unit receiving the measured delay, a measurement of a time period of the reference clock signal and the measured number of clock signal strokes for computing the corresponding period and initializing the countdown circuit to output the regenerated clock signal pulse.

18. An integrated circuit according to claim 17, wherein the time unit defining circuit comprises a sequence of delay circuits for receiving the reference clock signal, and wherein a delay applied by each delay circuit is equal to the time unit.

19. An integrated circuit according to claim 18, wherein the delay measurement circuit comprises:
   a read register; and
   a respective flip-flop circuit for each delay circuit;
   an input of each delay circuit being connected to an input of the associated flip-flop circuit, and an output of the flip-flop circuit being applied to a corresponding input of the read register.

20. An integrated circuit according to claim 19, wherein the pulses received from the serial bus are applied as a sequencing clock of the flip-flop circuits to obtain the measurements of the delays at output of the read register.

21. An integrated circuit according to claim 19, wherein the time unit defining circuit and the delay measurement circuit provide the measurement of the time period of the reference clock signal in the time unit, and wherein the reference clock signal is applied as a sequencing clock signal for the flip-flop circuits of the delay measurement circuit.

22. An integrated circuit according to claim 17, wherein each regeneration cycle is activated by a synchronization signal from which the countdown circuit is activated, the synchronization signal of a first regeneration cycle being provided by a second one of the at least two synchronization pulses, and the synchronization signal of each following regeneration cycle being provided by one of the regenerated clock signal pulse at the preceding cycle and another pulse received on the serial bus concurrently with the regenerated clock signal pulse.

23. An integrated circuit according to claim 17, wherein the countdown circuit is initialized at each regeneration cycle by a first initialization data element corresponding to the number of reference clock strokes to be counted down and a second initialization data element corresponding to a time unit to be counted down.

24. An integrated circuit according to claim 23, wherein the initialization data elements of the first regeneration cycle are generated by the computation unit from the measured delay, the measurement of the time period of the reference clock signal and the measured number of clock signal strokes, as starting data elements.

25. An integrated circuit according to claim 24, wherein the initialization data elements of each following regeneration cycle are generated by the computation unit from at least one starting data element for the initialization of the previous regeneration cycle.

26. An integrated circuit according to claim 23, wherein the starting data elements are updated during a transaction initiated with the serial bus.

27. An integrated circuit according to claim 23, wherein the counter circuit comprises a triggered counter, and wherein the first initialization data element is applied to the triggered counter which also receives the reference clock signal as a sequencing clock signal.

28. An integrated circuit according to claim 27, wherein the triggered counter comprises:
   a first counter for counting down a fixed value; and
   a second counter, connected in series to the first counter, for counting down a variable value that is variable as a function of the corresponding initialization data element, so that the computation unit generates the initialization data elements for the current regeneration cycle during the countdown of the fixed value by the first counter.

29. An integrated circuit according to claim 23 wherein the time unit defining circuit comprises a sequence of delay circuits for receiving the reference clock signal, wherein a delay applied by each delay circuit is equal to the time unit, wherein the countdown circuit comprises a transmission circuit for outputting a reference clock pulse delayed by a number of time units corresponding to the second initialization data element, and wherein the transmission circuit comprises an application circuit for applying the input of one of the delay circuits to the outputted reference clock pulse.

30. An integrated circuit according to claim 29, wherein the application circuit comprises:
a plurality of gates each being controlled by one of the delay circuits; and
a control circuit to control the gates so that only one is on as a function of the second initialization data element.

31. An integrated circuit according to claim 30, further comprising a calibrated pulse generator controlled by an output of the transmission circuit, for outputting the regenerated clock signal.

32. An integrated circuit according to claim 17, wherein the external serial bus is an USB type bus.

33. A smart card comprising:
a carrier; and
an integrated circuit carried by the carrier and including
an oscillator for providing a reference clock signal,
a serial bus, and
a device for the regeneration of a clock signal from at least two synchronization pulses transmitted on the external serial bus, the device comprising
a time unit defining circuit for defining a time unit,
a delay measurement circuit for providing a fine measurement, in the time unit, of a delay of the at least two synchronization pulses each with respect to a preceding pulse of the reference clock signal,
reference clock signal stroke measurement circuit for measuring a number of reference clock signal strokes between the two synchronization pulses,
a countdown circuit for outputting a regenerated clock signal pulse at each regeneration cycle, and
a computation unit receiving the measured delay, a measurement of a time period of the reference clock signal and the measured number of clock signal strokes for computing the corresponding period and initializing the countdown circuit to output the regenerated clock signal pulse.

34. A smart card according to claim 33, wherein the time unit defining circuit comprises a sequence of delay circuits for receiving the reference clock signal, and wherein a delay applied by each delay circuit is equal to the time unit.

35. A smart card according to claim 34, wherein the delay measurement circuit comprises:
a read register; and
a respective flip-flop circuit for each delay circuit;
an input of each delay circuit being connected to an input of the associated flip-flop circuit, and an output of the flip-flop circuit being applied to a corresponding input of the read register.

36. A smart card according to claim 35, wherein the pulses received from the serial bus are applied as a sequencing clock of the flip-flop circuits to obtain the measurements of the delays at output of the read register.

37. A smart card according to claim 35, wherein the time unit defining circuit and the delay measurement circuit provide the measurement of the time period of the reference clock signal in the time unit, and wherein the reference clock signal is applied as a sequencing clock signal for the flip-flop circuits of the delay measurement circuit.

38. A smart card according to claim 33, wherein each regeneration cycle is activated by a synchronization signal from which the countdown circuit is activated, the synchronization signal of a first regeneration cycle being provided by a second one of the at least two synchronization pulses, and the synchronization signal of each following regeneration cycle being provided by one of the regenerated clock signal pulse at the preceding cycle and another pulse received on the serial bus concurrently with the regenerated clock signal pulse.

39. A smart card according to claim 33, wherein the countdown circuit is initialized at each regeneration cycle by a first initialization data element corresponding to the number of reference clock strokes to be counted down and a second initialization data element corresponding to a time unit to be counted down.

40. A smart card according to claim 39, wherein the initialization data elements of the first regeneration cycle are generated by the computation unit from the measured delay, the measurement of the time period of the reference clock signal and the measured number of clock signal strokes, as starting data elements.

41. A smart card according to claim 40, wherein the initialization data elements of each following regeneration cycle are generated by the computation unit from at least one starting data element for the initialization of the previous regeneration cycle.

42. A smart card according to claim 41, wherein the starting data elements are updated during a transaction initiated with the serial bus.

43. A smart card according to claim 39, wherein the counter circuit comprises a triggered counter, and wherein the first initialization data element is applied to the triggered counter which also receives the reference clock signal as a sequencing clock signal.

44. A smart card according to claim 43, wherein the triggered counter comprises:
a first counter for counting down a fixed value; and
a second counter, connected in series to the first counter, for counting down a variable value that is variable as a function of the corresponding initialization data element, so that the computation unit generates the initialization data elements for the current regeneration cycle during the countdown of the fixed value by the first counter.

45. A smart card according to claim 39 wherein the time unit defining circuit comprises a sequence of delay circuits for receiving the reference clock signal, wherein a delay applied by each delay circuit is equal to the time unit, wherein the countdown circuit comprises a transmission circuit for outputting a reference clock pulse delayed by a number of time units corresponding to the second initialization data element, and wherein the transmission circuit comprises an application circuit for applying the input of one of the delay circuits to the outputted reference clock pulse.

46. A smart card according to claim 45, wherein the application circuit comprises:
a plurality of gates each being controlled by one of the delay circuits; and
a control circuit to control the gates so that only one is on as a function of the second initialization data element.

47. A smart card according to claim 46, further comprising a calibrated pulse generator controlled by an output of the transmission circuit, for outputting the regenerated clock signal.

48. A smart card according to claim 33, wherein the external serial bus is an USB type bus.

* * * * *